Patented June 20, 1944

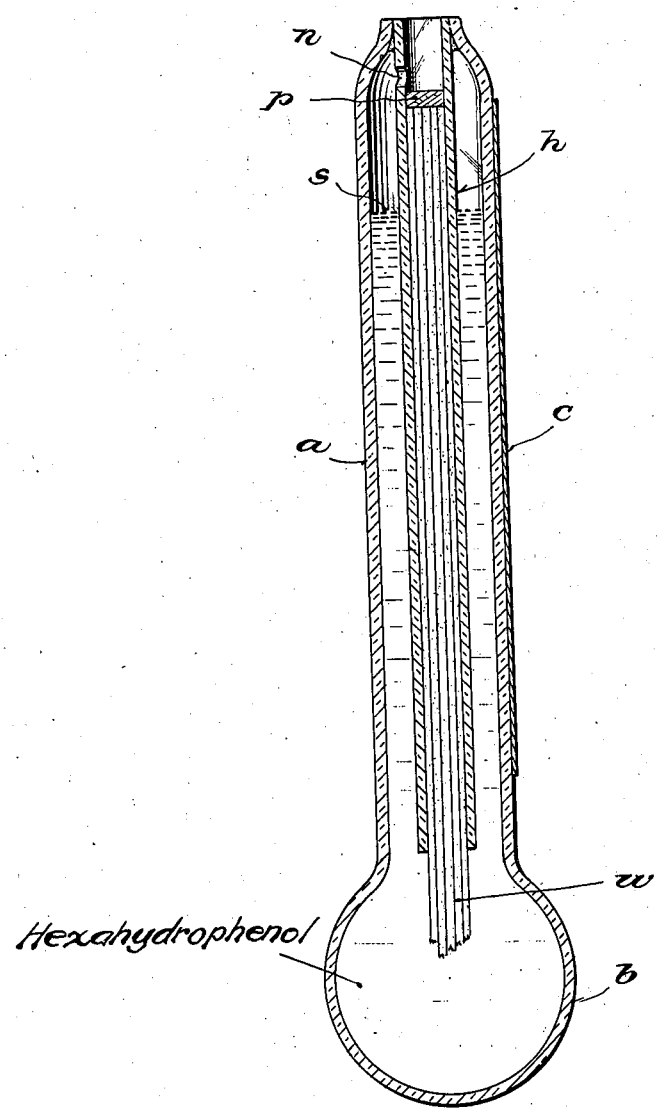

2,351,920

UNITED STATES PATENT OFFICE 2,351,920

APPARATUS FOR MEASURING HEAT CONSUMPTION

Oscar Constantin Brun, Copenhagen, Denmark; vested in the Alien Property Custodian Application August 19, 1939, Serial No. 291,095
In Denmark August 23, 1938

1 Claim. (Cl. 73—193)

The consumption of heat from radiators and hot-water-cocks in heating plants is ordinarily measured by evaporation of a liquid from containers enclosed in meters, which are arranged at each individual heat delivering member of the heating plant so as to be heated from the said member in question.

Ordinarily the said liquid is tetraline, because the boiling point of this liquid is sufficiently high and because the evaporation characteristic of tetraline has a form which within the ranges of temperatures coming into consideration by measuring heat delivered, for instance from radiators, corresponds nearly to the form of the characteristic curve of heat delivery of a radiator.

Now heat measuring meters of the said kind have a considerable non-load evaporation, which means that even if no heat is delivered from the heating plant the meters would nevertheless record a consumption, viz. the said non-load evaporation, due to the fact that at ordinary room-temperature a considerable amount of the measuring liquid, viz. tetraline, would evaporate. This causes an incorrectness of the result of the measuring, and this incorrectness is rather considerable and may amount to 25–50% of the recorded consumption. For this reason the recorded amount of heat cannot be relied upon as a base for the calculation of the share of the individual consumers in the total heat consumption from the heating plant.

It has been proposed to remedy this drawback by fitting the measuring scale of the meter with means for compensating the non-load evaporation depending upon the time in which the meter has been in use before the registration is read. In this way it is however not possible to secure a sufficient correctness of the measuring, because the properties of the tetraline, and specially the speed of evaporation of tetraline change gradually due to the influence of air and heat, and probably also due to the influence of the light, so that gradually the speed of evaporation of tetraline decreases and this influences the registration of the consumption of heat to a detrimental degree.

The object of the present invention is to overcome or eliminate the incorrectness of the measured consumption due to non-load evaporation of the measuring liquid, and a further object of the invention is to overcome or eliminate the incorrectness of the registered consumptions, due to changes of property of the measuring liquid.

According to the present invention the purpose aimed at is attained by the use of a measuring liquid, which from the air slowly absorbs humidity to such a degree, that the amount of humidity absorbed during a certain time by the measuring liquid is less than twice the amount of the said liquid, which at ordinary room-temperature would evaporate in the course of a corresponding time.

If the measuring liquid absorbs from the air an amount of humidity less than twice the amount of liquid, which simultaneously disappears due to non-load evaporation, then this absorption would cause a relative increase of the volume of the liquid contained in the meter, so that the observed descent of the surface of the liquid in the container of the meter would correspond not to the amount of liquid, which has evaporated, but to the difference between this amount of liquid and the volume of humidity absorbed from the air.

It would be obvious that, if this amount of liquid is less than twice the amount of the measuring liquid evaporating at ordinary room-temperature, say about 68° F., the deviation of the registered consumption read on the measuring scale of the meter from the correct consumption would numerically be less than the incorrectness caused by the non-load evaporation.

Hitherto experts in the art have been of opinion that hygroscopic liquids are not applicable as measuring liquids in meters for measuring heat consumption by evaporation of a liquid, but this consideration must now be considered to be incorrect, because a hygroscopic liquid, which fulfils the above mentioned requirement with respect to the amount of humidity absorbed from the air, and further has a boiling point of a proper high value, for instance 300 to 400° F. and a proper characteristic curve of evaporation would be applicable for the said purpose. Such a liquid is hexahydrophenol ($C_6H_{11}OH$).

It has been observed that the evaporation of hexahydrophenol when influenced by the heat to be recorded does not vary to any considerable degree with the contents of humidity in the hexahydrophenol, and further the amount of humidity absorbed for instance in the course of a measuring season is less than the amount of hexahydrophenol, which in the course of the measuring season evaporates at ordinary room-temperature. The absorbed humidity therefore partly compensates for the incorrectness, due to the non-load evaporation, since the absorption causes an apparent reduction of above 50% or the more of the non-load evaporation. For this reason more correct registrations are read on the measuring scale of the meter.

Hexahydrophenol has this property, since it is a solid material at ordinary room temperature and maintains its solid state as long as it has not had the occasion to absorb humidity. Hence the advantage is obtained by using hexahydrophenol as a measuring liquid in meters of evaporation fitted with a wick, that the hexahydrophenol is not able to ascend the wick to the top of the same, from which the evaporation takes place, before it has been subjected to the influence of heat. Therefore, a meter, which is supplied with hexahydrophenol at a shorter or longer time before the commencement of the heating season, has practically no non-load evaporation and does not absorb humidity before the hexahydrophenol is added which might cause an elevation of the surface of the hexahydrophenol in the meter, in which event the subsequent registrations would not be correct.

The single figure of the drawing shows diagrammatically a meter according to the invention comprising a tube open at its upper end and with an enlarged bulb at the lower end, filled partly with hexahydrophenol and a wick. A scale indicates the degree of evaporation and consequently of heat consumption.

The tube $a$ shows, by way of example, one form of container adapted for use in measuring apparatus of this nature, the enlarged bulb $b$ at the lower end receiving and storing the hexahydrophenol, herein shown as extending within the body portion of the tube to the surface lever $s$. The wick tube $h$ open at both ends, is fused at its upper end within the reduced top portion of tube $a$, so that the bore of wick tube $h$ is the only area in which absorption or evaporation can take place. The pressure-equalizing aperture $n$ in the wick tube serves also as a filling vent, whenever it becomes necessary to add hexahydrophenol. The lower end of the wick tube $h$ extends substantially to the bulb $b$, the wick $w$, of any suitable material, emerging from the bottom of tube $h$ into the neck of the bulb. The upper end of the wick is below the aperture $n$, and a porous pad $p$ is shown as resting upon the wick to assure uniform evaporating surface.

An indicating chart $c$ is shown exteriorly of the body of the tube $a$, and may be slitted as desired to readily show the varying levels $s$ of the measuring liquid, suitable calibrated indicia being arranged vertically on the chart.

Having now particularly described and ascertained the nature of my invention and in what manner the same is to be performed I declare that what I claim is:

A heat consumption meter of the evaporation type comprising an open container adapted to be heated by a heat delivering member and an amount of hexahydrophenol in said container adapted to be evaporated.

OSCAR CONSTANTIN BRUN.